United States Patent
Gonze et al.

(10) Patent No.: US 9,051,853 B2
(45) Date of Patent: Jun. 9, 2015

(54) SYSTEM AND METHOD FOR CONTROLLING FLUID FLOW INTO AND/OR OUT OF A CATALYTIC HEAT EXCHANGER BASED ON A CATALYST TEMPERATURE

(75) Inventors: Eugene V. Gonze, Pinckney, MI (US); Stuart R. Smith, Howell, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 13/598,045

(22) Filed: Aug. 29, 2012

(65) Prior Publication Data

US 2014/0060044 A1 Mar. 6, 2014

(51) Int. Cl.
| | |
|---|---|
| F01N 3/00 | (2006.01) |
| F01N 3/10 | (2006.01) |
| F01N 3/02 | (2006.01) |
| F01N 5/02 | (2006.01) |
| G05D 23/00 | (2006.01) |
| F01K 23/10 | (2006.01) |
| F02G 5/02 | (2006.01) |
| F01K 23/06 | (2006.01) |
| F01N 3/28 | (2006.01) |

(52) U.S. Cl.
CPC . *F01K 23/10* (2013.01); *F01N 5/02* (2013.01); *F02G 5/02* (2013.01); *F01K 23/065* (2013.01); *F01N 3/101* (2013.01); *F01N 3/2889* (2013.01); *Y02T 10/16* (2013.01); *Y02T 10/22* (2013.01)

(58) Field of Classification Search
USPC ............... 60/298, 299, 301, 320; 165/299
See application file for complete search history.

(56) References Cited

U.S. PATENT DOCUMENTS

| | | | | |
|---|---|---|---|---|
| 5,987,885 | A * | 11/1999 | Kizer et al. | 60/298 |
| 6,021,640 | A * | 2/2000 | Hirota et al. | 60/300 |
| 2005/0126158 | A1* | 6/2005 | Benz et al. | 60/275 |
| 2013/0219882 | A1* | 8/2013 | Jensen | 60/604 |

* cited by examiner

*Primary Examiner* — Audrey K Bradley

(57) ABSTRACT

A system includes a heat exchanger and a fluid flow control module. The heat exchanger includes a substrate, a catalyst applied to the substrate, and fluid passages. Exhaust gas from an engine flows through the heat exchanger and a working fluid in the fluid passages absorbs heat from the exhaust gas. The fluid flow control module controls fluid flow from the heat exchanger based on a temperature of the catalyst.

22 Claims, 4 Drawing Sheets

SYSTEM AND METHOD FOR CONTROLLING FLUID FLOW INTO AND/OR OUT OF A CATALYTIC HEAT EXCHANGER BASED ON A CATALYST TEMPERATURE

FIELD

The present disclosure relates to systems and methods for controlling fluid flow into and/or out of a catalytic heat exchanger based on a catalyst temperature.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle valve, which adjusts a throttle area to control air flow into the engine. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Only a percentage (e.g., 30 percent) of the energy generated by combustion within an engine may be used to produce drive torque. The remainder of the energy may dissipate into the atmosphere as waste heat, increasing the temperature of nearby vehicle systems. A heating, ventilation, and air conditioning (HVAC) system may recover some of the waste heat for use in heating a passenger compartment. HVAC systems, however, do not convert the waste heat into mechanical or electrical energy.

SUMMARY

A system includes a heat exchanger and a fluid flow control module. The heat exchanger includes a substrate, a catalyst applied to the substrate, and fluid passages. Exhaust gas from an engine flows through the heat exchanger and a working fluid in the fluid passages absorbs heat from the exhaust gas. The fluid flow control module controls fluid flow from the heat exchanger based on a temperature of the catalyst.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A waste heat recovery system according to the principles of the present disclosure recovers waste heat from exhaust gas produced by an engine and converts the waste heat into mechanical energy and/or electrical energy. The WHR system includes a heat exchanger, an expander, a condenser, a reservoir, a control valve, and/or a pump. The pump sends a working fluid (e.g., water, ethanol) from the reservoir to the heat exchanger. The control valve regulates fluid flow between the reservoir and the heat exchanger.

Heat exchanges between exhaust gas and the working fluid within the heat exchanger. As heat is transferred from the exhaust gas to the working fluid, the temperature of the working fluid increases. The working fluid flows from the heat exchanger to the expander, which uses thermal energy in the working fluid to perform mechanical work. In one example, the expander includes a piston that is driven by the working fluid as the working fluid expands. The heat exchanger includes a catalyst that reacts with exhaust gas to reduce emissions.

A control system and method according to the principles of the present disclosure controls fluid flow through the WHR system based on the temperature of the catalyst within the heat exchanger to reduce emissions and/or improve fuel economy. The working fluid is trapped in the heat exchanger when an engine is shut down and the catalyst temperature is greater than a predetermined temperature. This increases the catalyst cool-down period and may decrease the period required to heat the catalyst to a light-off temperature during the next engine startup. The working fluid is purged from the heat exchanger when an engine is shut down and the catalyst temperature is less than the predetermined temperature. This limits the amount of mass that must be heated to increase the catalyst temperature, which decreases the period required to heat the catalyst temperature to the light-off temperature during the next engine startup.

Figure 1:
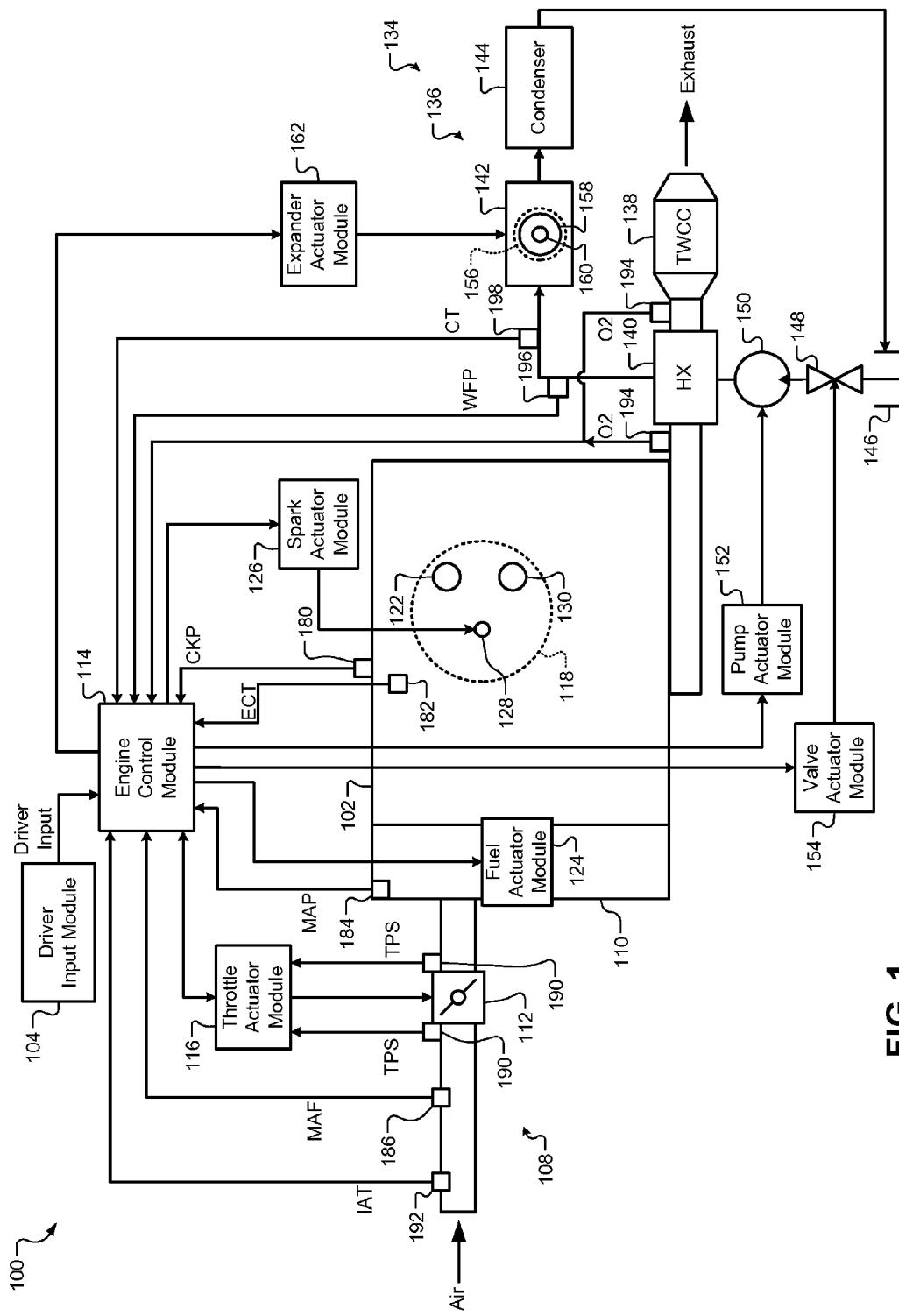
FIG. 1 is a functional block diagram of an example engine system according to the principles of the present disclosure.

Referring now to FIG. 1, an engine system 100 includes an engine 102 that combusts an air/fuel mixture to produce drive torque for a vehicle based on driver input from a driver input module 104. The driver input includes an accelerator pedal position and/or a cruise control setting. Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders under certain engine operating conditions to improve fuel economy.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The exhaust system 134 includes a waste heat recovery (WHR) system 136 and a three-way catalytic converter 138. The WHR system 136 recovers waste heat from exhaust gas produced by the engine 102 and converts the waste heat into mechanical energy and/or electrical energy. The WHR system 136 may be a closed system that uses a Rankine cycle. The three-way catalytic converter 138 reacts with exhaust gas to reduce emissions.

The WHR system 136 includes a heat exchanger 140, an expander 142, a condenser 144, a reservoir 146, a control valve 148, and a pump 150. A pump actuator module 152 activates the pump 150 to send a working fluid (e.g., water, ethanol) from the reservoir 146 to the heat exchanger 140. A valve actuator module 154 opens the control valve 148 to allow the working fluid to flow between the reservoir 146 and the heat exchanger 140. The heat exchanger 140 may be located above the reservoir 146 and the working fluid may be supplied to the bottom of the heat exchanger. Thus, when the pump 150 is off and the control valve 148 is open, gravity may be used to purge the working fluid from the heat exchanger 140 through the control valve 148.

The heat exchanger 140 facilitates a heat exchange between exhaust gas flowing through the heat exchanger 140 and the working fluid flowing through or held within the heat exchanger 140. As the working fluid absorbs waste heat from the exhaust gas, the temperature of the working fluid increases. The pressurized and heated working fluid flows from the heat exchanger 140 to the expander 142.

Figure 2:
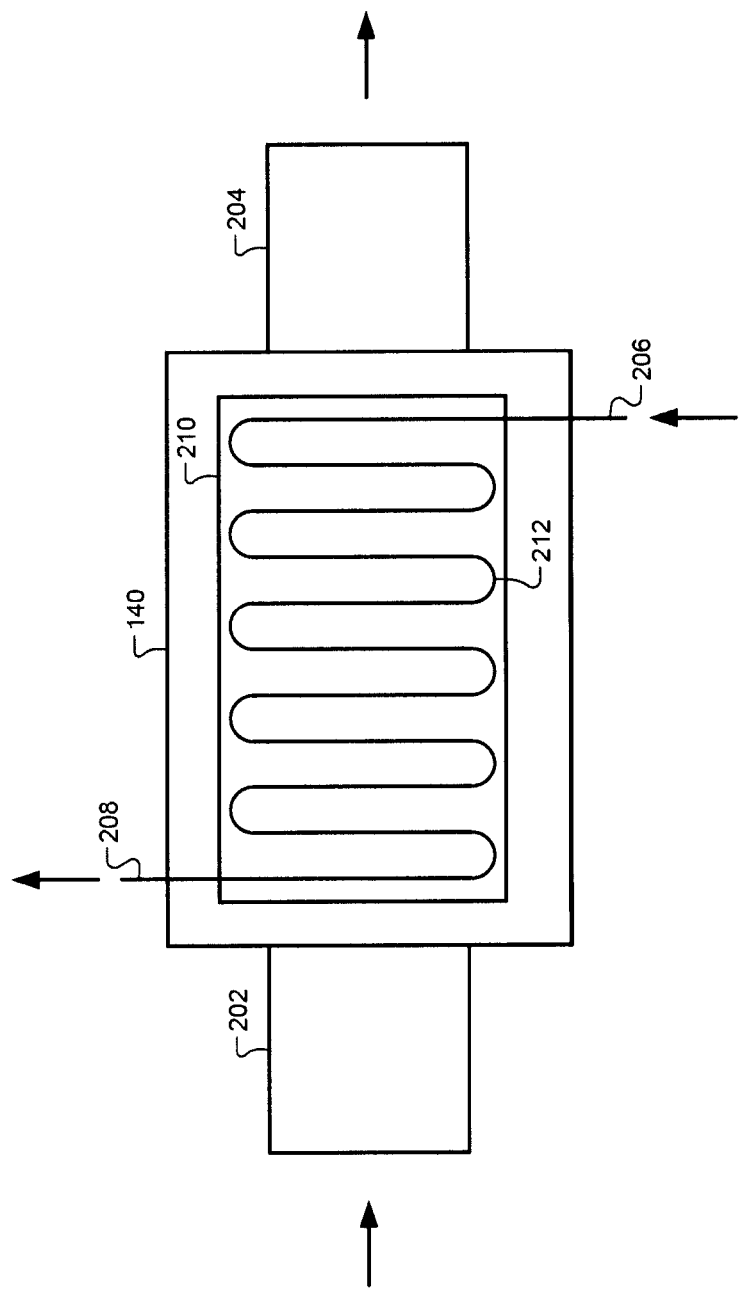
FIG. 2 is a functional block diagram of an example catalytic heat exchanger according to the principles of the present disclosure.

Referring briefly to FIG. 2, an example implementation of the heat exchanger 140 includes an exhaust inlet 202, an exhaust outlet 204, a fluid inlet 206, a fluid outlet 208, a substrate 210, and fluid passages 212. Exhaust gas enters the heat exchanger 140 through the exhaust inlet 202 and exits the heat exchanger 140 through the exhaust outlet 204. The working fluid enters the heat exchanger 140 through the fluid inlet 206 and exits the heat exchanger 140 through the fluid outlet 208. Fluid flow through the fluid inlet 206 may be regulated by the control valve 148, and fluid flow out of through the fluid outlet 208 may be regulated by the expander 142. Alternatively, the heat exchanger can include valves that regulate fluid flow into and out of the heat exchanger 140.

Exhaust gas passes through the substrate 210 as the exhaust gas travels from the exhaust inlet 202 to the exhaust outlet 204. The substrate 210 is formed from a porous material of high thermal conductivity, such as graphite foam, to allow exhaust gas to pass through the substrate 210 while maximizing the amount of heat absorbed from the exhaust gas. The substrate 210 is coated with a catalyst, such as that found in a three-way catalytic converter, which reacts with exhaust gas to reduce emissions. In this regard, the heat exchanger 140 may be referred to as a catalytic heat exchanger.

The fluid passages 212 extend through the substrate 210 in a coil pattern to maximize the amount of heat absorbed by the working fluid within the fluid passages 212. The working fluid within the fluid passages 212 absorbs heat from the substrate 210 and from exhaust gas flowing through the substrate 210.

Referring again to FIG. 1, the expander 142 includes a cylinder 156, a piston 158 disposed within the cylinder 156, and an injection valve 160 that regulates fluid flow into the cylinder 156. While only the cylinder 156 is shown, the expander 142 may include multiple cylinders. An expander actuation module 162 opens the injection valve 160 to allow the working fluid to flow into the cylinder 156. The working fluid drives the piston 158 as the fluid expands, which rotates a crankshaft that is coupled to the piston. The crankshaft may be coupled to a driveshaft using, for example, a ring gear or a belt to produce drive torque. Alternatively, the crankshaft may be coupled to a generator to produce electrical energy for use by vehicle systems or for storage in a battery.

The position of the crankshaft is measured using a crankshaft position (CKP) sensor 180. The temperature of engine coolant is measured using an engine coolant temperature (ECT) sensor 182. The ECT sensor 182 may be located within the engine 102 or at other locations where coolant is circulated, such as a radiator (not shown).

The pressure within the intake manifold 110 is measured using a manifold absolute pressure (MAP) sensor 184. In various implementations, engine vacuum, which is the difference between ambient air pressure and the pressure within the intake manifold 110, is measured. The mass flow rate of air flowing into the intake manifold 110 is measured using a mass air flow (MAF) sensor 186. In various implementations, the MAF sensor 186 is located in a housing that also includes the throttle valve 112.

The throttle actuator module 116 monitors the position of the throttle valve 112 using one or more throttle position sensors (TPS) 190. The ambient temperature of air being drawn into the engine 102 is measured using an intake air temperature (IAT) sensor 192. Oxygen levels of exhaust gas flowing through the exhaust system 134 are measured using oxygen sensors 194. The oxygen sensors 194 may be located upstream and downstream from the heat exchanger 140 as shown or at other locations within the exhaust system 134.

The pressure of the working fluid on an outlet side of the heat exchanger 140 is measured using a working fluid pressure (WFP) sensor 196. The temperature of the catalyst within the heat exchanger 140 is measured using a catalyst temperature (CT) sensor 198. The CT sensor 198 may be located downstream from the heat exchanger 140 as shown or at another location within the WHR system 136 such as within the heat exchanger 140. The ECM 114 uses signals from the sensors to make control decisions for the engine system 100.

The ECM 114 controls fluid flow through the WHR system 136 based on the catalyst temperature. The ECM 114 traps the working fluid in the heat exchanger 140 when the engine 102 is shut down and the catalyst temperature is greater than a predetermined temperature. The ECM 114 purges the working fluid from the heat exchanger 140 when the engine 102 is shut down and the catalyst temperature is less than the predetermined temperature. The ECM 114 may purge the working fluid through the expander 142 until the working fluid pressure is less than a predetermined pressure, at which point the ECM 114 may purge the working fluid through the control valve 148 using gravity.

Figure 3:
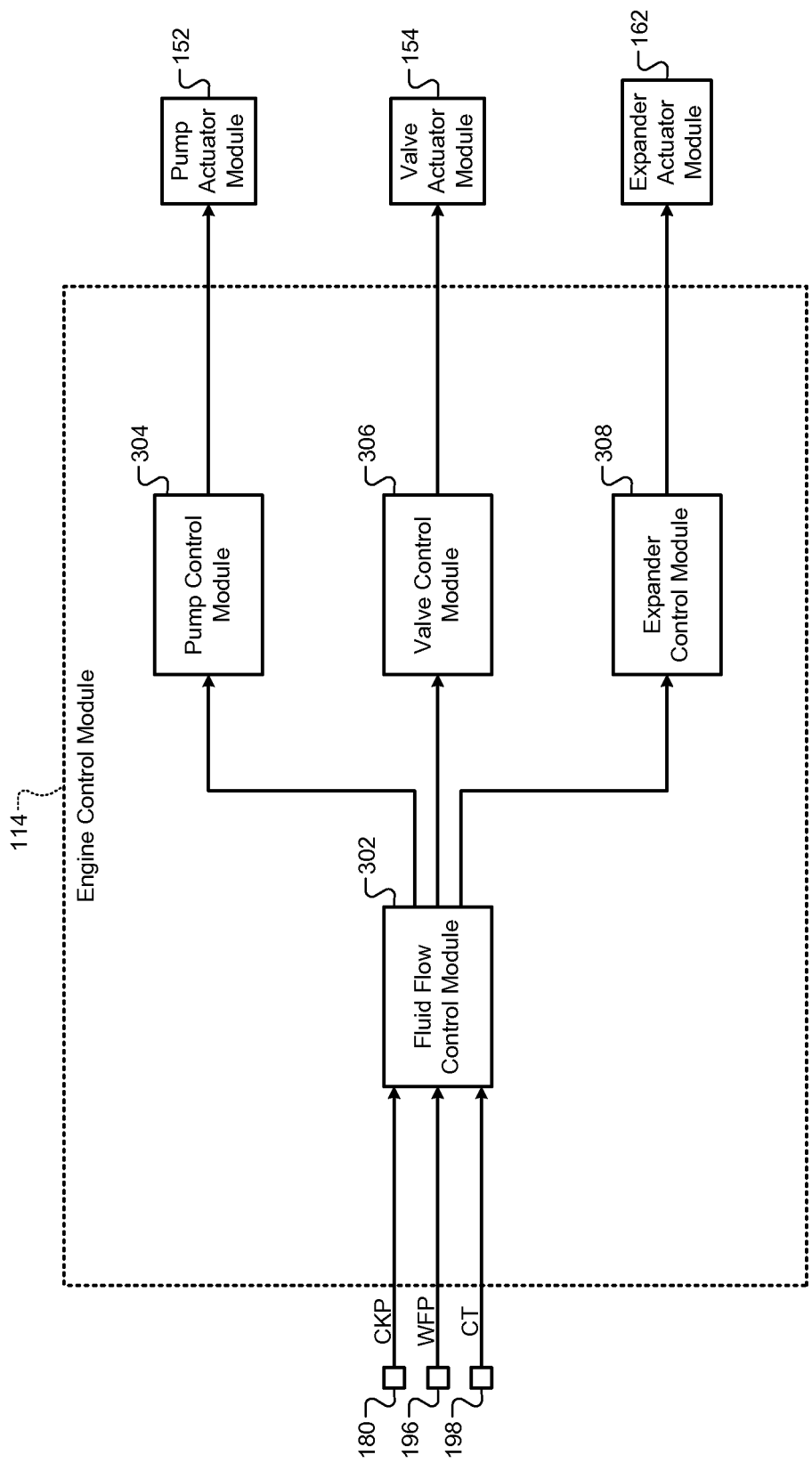
FIG. 3 is a functional block diagram of an example control system according to the principles of the present disclosure.

Referring now to FIG. 3, an example implementation of the ECM 114 includes a fluid flow control module 302, a pump control module 304, a valve control module 306, and an expander control module 308. The fluid flow control module 302 controls fluid flow through the WHR system 136 based on the catalyst temperature from the CT sensor 198. The fluid flow control module 302 controls fluid flow through the WHR system 136 by sending instructions to the pump control module 304, the valve control module 306, and/or the expander control module 308.

The pump control module 304 activates and deactivates the pump 150 based on instructions received from the fluid flow control module 302. The valve control module 306 opens and closes the control valve 148 based on instructions received from the fluid flow control module 302. The expander control module 308 activates the expander 142 (e.g., opens the injection valve 160) and deactivates the expander 142 (e.g., closes the injection valve 160) based on instructions received from the fluid flow control module 302.

The fluid flow control module 302 traps the working fluid in the heat exchanger 140 when the engine 102 is shut down and the catalyst temperature is greater than a first temperature. The fluid flow control module 302 determines when the engine 102 is shutdown based on input received from the CKP sensor 180 and/or an ignition system. The first temperature may be predetermined based on a light-off temperature of the catalyst within the heat exchanger 140. For example, the first temperature may be 250 degrees Celsius (° C.). The fluid flow control module 302 traps the working fluid in the heat exchanger 140 by instructing the valve control module 306 to close the control valve 148 and instructing the expander control module 308 to deactivate the expander 142.

The fluid flow control module 302 purges the working fluid from the heat exchanger 140 when the engine 102 is shut down and the catalyst temperature is less than the first temperature. The fluid flow control module 302 purges the working fluid through the expander 142 when the working fluid pressure from the WFP sensor 196 is greater than a predetermined pressure. The fluid flow control module 302 purges the working fluid through the expander 142 by instructing the expander control module 308 to activate the expander 142 and instructing the valve control module 306 to close the control valve 148. Purging the working fluid through the expander 142 allows the expander 142 to convert waste heat into mechanical work, which may improve fuel economy.

The fluid flow control module 302 purges the working fluid through the control valve 148 using gravity when the working fluid pressure is less than the predetermined pressure. The fluid flow control module 302 purges the working fluid from the heat exchanger 140 through the control valve 148 by instructing the valve control module 306 to open the control valve 148. In addition, the fluid flow control module 302 instructs the expander control module 308 to maintain the expander 142 in an activated state.

The fluid flow control module 302 instructs the pump control module 304 to deactivate the pump 150 when the engine 102 is shut down. The fluid flow control module 302 also instructs the pump control module 304 to deactivate the pump 150 when the engine 102 is running (e.g., cranking, started) and the catalyst temperature is less than a second temperature. In addition, the fluid flow control module 302 instructs the valve control module 306 to close the control valve 148 and instructs the expander control module 308 to deactivate the expander 142. The second temperature may be predetermined based on the type of working fluid circulated through the heat exchanger 140.

Figure 4:
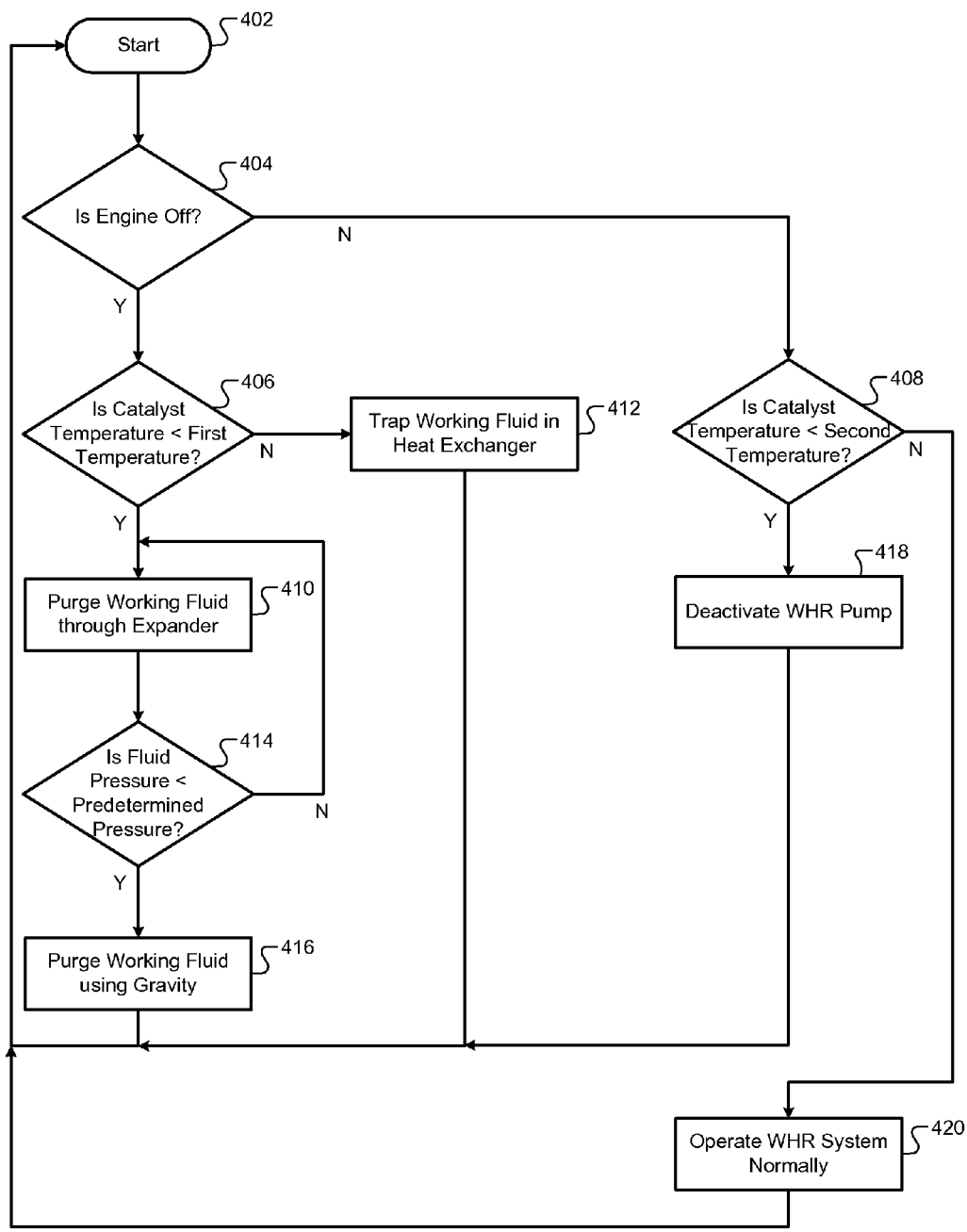
FIG. 4 is a flowchart illustrating an example control method according to the principles of the present disclosure.

Referring now to FIG. 4, a method for controlling fluid flow through a WHR system according to the principles of the present disclosure begins at 402. The WHR system recovers waste heat from exhaust gas produced by an engine and converts the waste heat into mechanical energy and/or electrical energy. The WHR system includes a heat exchanger, an expander, a reservoir, a pump, and/or a control valve.

The heat exchanger facilitates a heat exchange between exhaust gas flowing through the heat exchanger and a working fluid (e.g., water, ethanol) flowing through or trapped within the heat exchanger. As heat is transferred from the exhaust gas to the working fluid, the pressure of the working fluid increases. When activated, the expander uses the pressurized working fluid to perform mechanical work, which may be used to generate electrical energy. The heat exchanger includes a catalyst that reacts with exhaust gas to reduce emissions.

At 404, the method determines whether the engine is off (i.e., shut down). If the engine is off, the method continues at 406. Otherwise, the method continues at 408. At 406, the method determines whether the temperature of the catalyst disposed within the heat exchanger is less than a first temperature. The first temperature may be a predetermined value (e.g., 250° C.) and may be based on the type of catalyst disposed in the heat exchanger. If the catalyst temperature is less than the first temperature, the method continues at 410. Otherwise, the method continues at 412.

At 410, the method purges the working fluid from the heat exchanger through the expander by activating the expander. The method may also close the control valve to ensure that pressurized working fluid is sent to the expander rather than the reservoir. At 412, the method traps the working fluid in the heat exchanger. The method may trap the working fluid in the heat exchanger by deactivating the expander and closing the control valve.

In one example, the expander includes a cylinder, a piston disposed within the cylinder, and an injection valve, and activating the expander opens the injection valve, which allows the working fluid in the heat exchanger to flow into the cylinder. The working fluid then expands to drive the piston and thereby perform mechanical work. The method may close the control valve when purging the working fluid through the expander to prevent the working fluid from flowing through the control valve.

At 414, the method determines whether the pressure of the working fluid on an outlet side of the expander is less than a predetermined pressure. If the working fluid pressure is less than the predetermined pressure, the method continues at 416. Otherwise, the method continues to purge the working fluid from the heat exchanger through the expander.

At 416, the method purges the working fluid from the heat exchanger through the control valve using gravity. The method opens the control valve to purge the working fluid through the control valve. In addition, the method may maintain the heat exchanger in an activated state when purging the working fluid through the control valve.

At 408, the method determines whether the catalyst temperature is less than a second temperature. The second temperature may be a predetermined value (e.g., 450° C.) and may be based on the type of working fluid circulated through the WHR system. If the catalyst temperature is less than the second temperature, indicating a cold start, the method continues at 418. Otherwise, the method continues at 420.

At 418, the method deactivates the pump. Deactivating the pump at engine startup limits the amount of mass that must be heated to increase the catalyst temperature to a light-off temperature. The method may also deactivate the pump when the engine is off.

At 420, the method operates the WHR system normally. When operating the WHR system normally, the method may activate the expander, activate the pump, and open the control valve. The method may continue to operate the WHR system normally until the engine is shut down.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   a heat exchanger that includes a substrate, a catalyst applied to the substrate, and fluid passages, wherein the fluid passages are configured to allow a working fluid to pass therethrough to absorb heat from exhaust gas from an engine flowing through the substrate; and
   an engine control module that controls an expander disposed on an outlet side of the fluid passages to regulate fluid flow from the heat exchanger based on a temperature of the catalyst and an operating state of the engine.

2. The system of claim 1 wherein the engine control module controls fluid flow from the heat exchanger based on whether the engine is shut down.

3. The system of claim 1 further comprising:
   a pump that pumps the working fluid from a reservoir to the heat exchanger;
   a control valve that regulates fluid flow between the reservoir and the heat exchanger; and
   the expander, where the expander receives the working fluid from the heat exchanger and uses thermal energy in the working fluid to perform mechanical work.

4. The system of claim 3 wherein the expander includes a cylinder, a piston disposed within the cylinder, and an injection valve that delivers the working fluid to the cylinder to drive the piston.

5. The system of claim 3 wherein the engine control module deactivates the pump when the engine is running and the catalyst temperature is less than a predetermined temperature.

6. A method comprising:
   controlling an expander disposed on an outlet side of fluid passages in a heat exchanger to regulate fluid flow from the heat exchanger based on a temperature of a catalyst applied to a substrate in the heat exchanger and an operating state of an engine,
   wherein the fluid passages in the heat exchanger are configured to allow a working fluid to pass therethrough to absorb heat from exhaust gas from the engine flowing through the substrate.

7. The method of claim 6 further comprising controlling fluid flow from the heat exchanger based on whether the engine is shut down.

8. The method of claim 6 further comprising:
pumping the working fluid from a reservoir to the heat exchanger using a pump;
regulating fluid flow between the reservoir and the heat exchanger using a control valve;
receiving the working fluid from the heat exchanger in the expander; and
using thermal energy in the working fluid to perform mechanical work.

9. The method of claim 8 wherein the expander includes a cylinder, a piston disposed within the cylinder, and an injection valve that delivers the working fluid to the cylinder to drive the piston.

10. The method of claim 8 further comprising deactivating the pump when the engine is running and the catalyst temperature is less than a predetermined temperature.

11. A system comprising:
a heat exchanger that includes a substrate, a catalyst applied to the substrate, and fluid passages, wherein the fluid passages are configured to allow a working fluid to pass therethrough to absorb heat from exhaust gas from an engine flowing through the substrate;
an engine control module that controls fluid flow from the heat exchanger based on a temperature of the catalyst;
a pump that pumps the working fluid from a reservoir to the heat exchanger;
a control valve that regulates fluid flow between the reservoir and the heat exchanger; and
an expander that receives the working fluid from the heat exchanger and that uses thermal energy in the working fluid to perform mechanical work, wherein the engine control module purges the working fluid from the heat exchanger when the engine is shut down and the catalyst temperature is less than a predetermined temperature.

12. The system of claim 11 wherein the engine control module traps the working fluid in the heat exchanger when the engine is shut down and the catalyst temperature is greater than the predetermined temperature.

13. The system of claim 12 wherein the engine control module traps the working fluid in the heat exchanger by deactivating the expander and closing the control valve.

14. The system of claim 11 wherein the engine control module purges the working fluid from the heat exchanger through the expander when a pressure of the working fluid on an outlet side of the heat exchanger is greater than a predetermined pressure.

15. The system of claim 14 wherein the engine control module purges the working fluid through the expander by activating the expander and closing the control valve.

16. The system of claim 14 wherein the engine control module purges the working fluid from the heat exchanger through the control valve when the working fluid pressure on the outlet side of the heat exchanger is less than the predetermined pressure.

17. A method comprising:
controlling fluid flow from a heat exchanger based on a temperature of a catalyst applied to a substrate in the heat exchanger and an operating state of an engine, wherein fluid passages in the heat exchanger are configured to allow a working fluid to pass therethrough to absorb heat from exhaust gas from the engine flowing through the substrate;
pumping the working fluid from a reservoir to the heat exchanger using a pump;
regulating fluid flow between the reservoir and the heat exchanger using a control valve;
receiving the working fluid from the heat exchanger in an expander;
using thermal energy in the working fluid to perform mechanical work; and
purging the working fluid from the heat exchanger when the engine is shut down and the catalyst temperature is less than a predetermined temperature.

18. The method of claim 17 further comprising trapping the working fluid in the heat exchanger when the engine is shut down and the catalyst temperature is greater than the predetermined temperature.

19. The method of claim 18 further comprising trapping the working fluid in the heat exchanger by deactivating the expander and closing the control valve.

20. The method of claim 17 further comprising purging the working fluid from the heat exchanger through the expander when a pressure of the working fluid on an outlet side of the heat exchanger is greater than a predetermined pressure.

21. The method of claim 18 further comprising purging the working fluid through the expander by activating the expander and closing the control valve.

22. The method of claim 18 further comprising purging the working fluid from the heat exchanger through the control valve when the working fluid pressure on the outlet side of the heat exchanger is less than the predetermined pressure.

* * * * *